Aug. 14, 1945.  E. B. LEAR  2,382,644
BRAKE FOR HOISTS
Filed Aug. 5, 1943
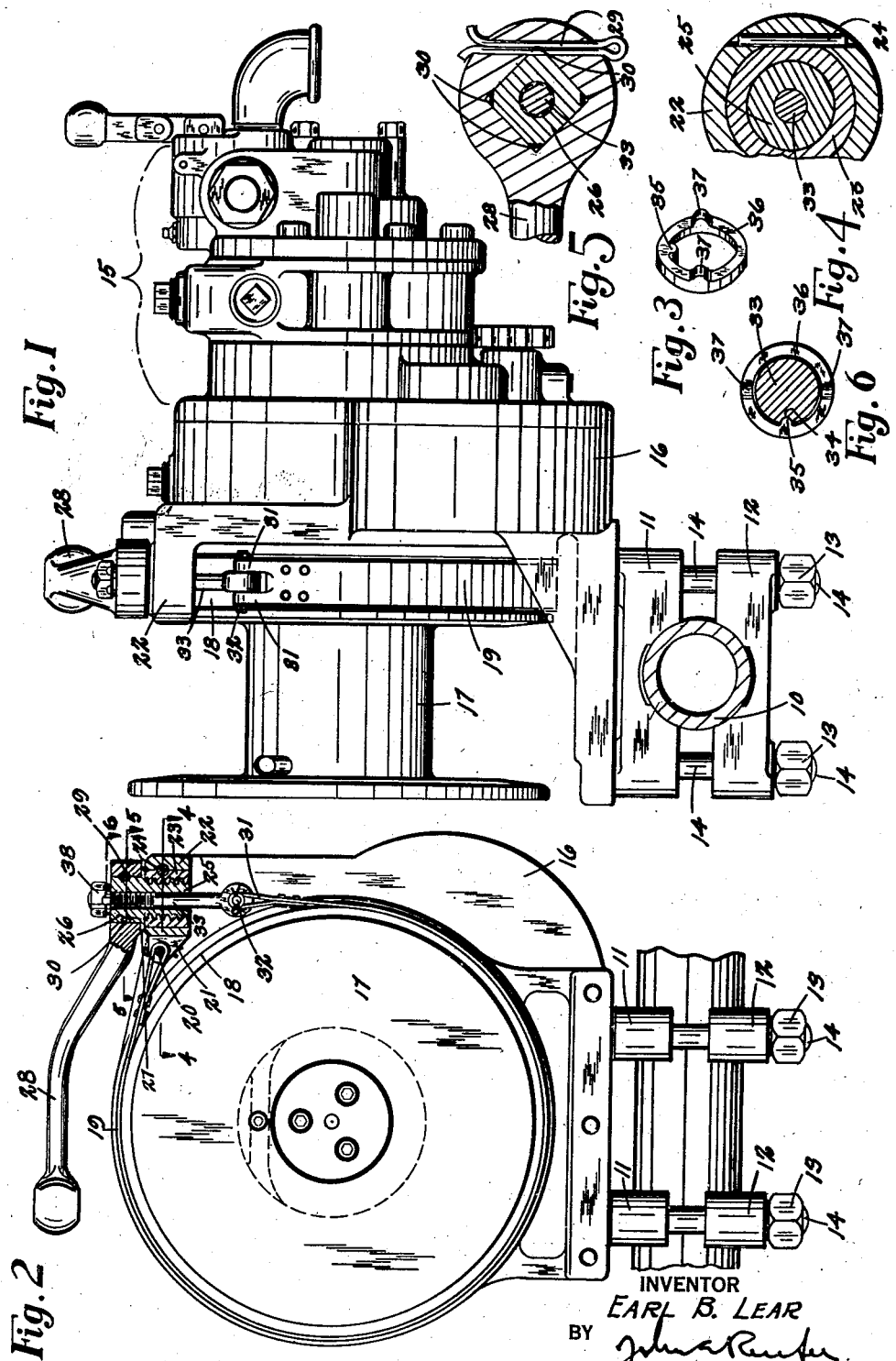
INVENTOR
EARL B. LEAR
BY
ATTORNEY Patented Aug. 14, 1945

2,382,644

UNITED STATES PATENT OFFICE 2,382,644

BRAKE FOR HOISTS

Earl B. Lear, Garfield Heights, Ohio, assignor to The Cleveland Pneumatic Tool Company, Clevland, Ohio, a corporation of Ohio Application August 5, 1943, Serial No. 497,426

3 Claims. (Cl. 188—77)

This invention relates to improvements in brake actuators, more particularly actuators for operating band brakes. By way of example the invention is illustrated herein as applied to band brakes for cable hoists.

One of the objects of the invention is the provision of brake operating means comprising a screw and a cooperating threaded collar, which parts may be manufactured separately from the other parts of the device, and are readily removable and replaceable.

Another object of the invention is the provision of means for adjusting the connection between the movable end of the brake band and the operating means, which adjustment may be effected whenever the operating means is relieved of stress, but is held against accidental movement when the parts are under stress.

Other objects and features of novelty will appear as I proceed with the description of that embodiment of the invention which, for the purposes of the present application, I have illustrated in the accompanying drawing, in which Fig. 1 is a side elevational view of a cable hoist embodying my improved brake band operating mechanism;

Fig. 2 is an end elevational view of the same, the brake band actuating means being shown principally in section;

Fig. 3 is a perspective view of a washer used in connection with the invention; and Figs. 4, 5 and 6 are sectional detail views taken substantially on lines 4, 5 and 6 respectively of Fig. 2.

In the drawing I have illustrated a cable hoist mechanism mounted on a cylindrical post or rail 10 by means of a pair of clamps, each of which comprises one jaw 11 fixed with respect to the hoist and another jaw 12 which is movable toward and away from jaw 11 by means of nuts 13 threaded upon the ends of studs 14 that are also rigid with the hoist.

The hoist may comprise a pressure fluid motor shown generally at 15, a gear casing 16, and a drum 17 upon which the hoist cable, not shown, is wound. One of the flanges of drum 17 carries a brake drum 18 of conventional form, around which extends a brake band 19. One end of the latter is anchored by being looped around a bolt or the like 20 that is mounted in lugs 21 carried by a fixed bracket 22.

The bracket 22 has a cylindrical opening therethrough, the axis of which is substantially tangential to the surface of drum 18. In this opening I mount a collar 23 which is internally threaded. Suitable means are provided for holding the collar against movement in any direction. As illustrated this means consists of a pin 24 driven into a drilled opening partially in the bracket 22 and partially in the collar 23.

Coaxial with the collar 23 there is a member, the lower portion of which constitutes a hollow screw 25 and the upper portion 26 of which is square in cross section. The member 25, 26 has an axial bore which is smooth throughout its extent. Between the screw and the threaded portion of member 25, 26 there is a relatively thin flange 27 of somewhat greater diameter than the diameter of the cylindrical opening in bracket 22. This flange acts as a stop to limit the downward movement of screw 25.

A handle 28 is provided as a convenient means for turning member 25, 26. This handle is preferably separable from the square portion 26 of that member. It has a square opening therethrough to fit over the square portion 26, and it may be retained against accidental axial movement by means of a cotter pin 29 extending through an opening in the handle and any one of four grooves 30 in the squared portion 26.

The free end of brake band 19 may be doubled over to form a loop which is cut away in the middle to constitute two bifurcations 31 that carry a bolt or the like 32 which is received within an eye at the lower extremity of a pin 33 which extends upwardly through the axial bore in the hollow member 25, 26.

The upper end of pin 33, which is threaded as shown in Fig. 2 has a keyway 34 formed therein which receives an internal projection 35 on a washer 36 which surrounds pin 33 and bears against the upper surface of the member 25, 26. The lower side of this washer is smooth to permit relative motion between the washer and the member 25, 26, but the upper surface is provided with a plurality of upwardly extending detents 37 with gradually curved sides that are adapted to take into correspondingly formed notches in the lower surface of a nut 38 that is threaded onto the upper end of pin 33.

In assembling the device the hollow member 25, 26 is threaded down onto the collar 23 as far as it will go, in other words until the flange 27 engages the bracket 22. Pin 33 is then inserted into the axial bore in member 25, 26 from the bottom of the latter, and the washer 36 is dropped over the protruding end of the pin with the projection 35 engaging the keyway 34 in the pin. Nut 38 is then threaded onto the end of the pin. When it engages the washer 36, the notches in the nut 38 are cammed over the projections 37 until the slack in the band 19 is taken up. When resistance to turning of the nut 38 reaches a value determined by experience to be proper, this adjustment may be considered complete, and the nut 38 is locked against accidental movement upon the pin.

To cause the band 19 to engage the drum 18 with braking effect the operator turns handle 28 in the direction to cause the screw 25 to move upwardly, as viewed in Fig. 2 of the drawing thereby exerting a pull upon pin 33. Movement of the handle in the opposite direction of course relieves the braking pressure. The parts are proportioned so that considerable mechanical advantage is obtained, and the manual operation of the brake is rendered easy.

Having thus described my invention, I claim:

1. In combination, a brake drum, a brake band extending around said drum, a bracket having a central bore therethrough the axis of which is substantially tangential to the surface of the drum, means for anchoring one end of said band to said bracket, and means for exerting a pull upon the opposite end of said band comprising a headed pin attached to said band, a hollow screw surrounding the pin and engaging its head, an internally threaded collar in the central bore of said bracket into which said screw extends, a pin extending through said bracket and having engagement throughout a substantial part of its perimeter with said collar for holding the collar against rotation as well as against axial movement, and means for turning the screw.

2. In combination, a brake drum, a brake band extending around said drum, a bracket having a central bore therethrough, means for anchoring one end of said band to said bracket, and means for exerting a pull upon the opposite end of said band, said last named means including an internally threaded collar secured in the central bore of said bracket, a hollow screw movable in said collar, a flange intermediate the ends of said screw for limiting its movement in one direction, a pin carried by and movable with said hollow screw to which the other end of said band is attached, and means for turning the screw.

3. In combination, a brake drum, a brake band extending around said drum, a bracket having a central bore therethrough, means for anchoring one end of said band to said bracket, and means for exerting a pull upon the opposite end of said band, said last named means including an internally threaded collar secured in the central bore of said bracket, a member coaxial with said collar the lower portion of which is threaded for engagement with the threads of said collar and the upper portion of which is substantially square shaped in cross-section, a pin carried by and movable with said member to which the other end of said band is attached, and means mounted on said square shaped end for turning said member.

EARL B. LEAR.